(12) United States Patent
Apfelbaum et al.

(10) Patent No.: US 6,853,963 B1
(45) Date of Patent: Feb. 8, 2005

(54) ANALYZING AN EXTENDED FINITE STATE MACHINE SYSTEM MODEL

(75) Inventors: Larry Apfelbaum, West Newton, MA (US); Peter L. Savage, Mont Vernon, NH (US); Mark Trumpler, Lexington, MA (US); John D. Doyle, Hollis, NH (US); Thomas Lynch, Hollis, NH (US); Ramesh Vaswani, Nashua, NH (US)

(73) Assignee: Empirix Inc., Waltham, MA (US)

( * ) Notice: Subject to any disclaimer, the term of this patent is extended or adjusted under 35 U.S.C. 154(b) by 0 days.

(21) Appl. No.: 09/318,286

(22) Filed: May 25, 1999

(51) Int. Cl.$^7$ .................................................. G06F 9/45

(52) U.S. Cl. ............................ 703/2; 703/22; 703/17; 717/126

(58) Field of Search ............................... 703/2, 20, 27, 703/14, 17; 714/724, 1; 345/418; 717/8, 126, 131

(56) References Cited

U.S. PATENT DOCUMENTS

| | | | |
|---|---|---|---|
| 5,038,307 A | | 8/1991 | Krishnakumar et al. ..... 364/578 |
| 5,394,347 A | | 2/1995 | Kita et al. ................... 364/578 |
| 5,408,597 A | | 4/1995 | Kita et al. ................... 395/140 |
| 5,485,600 A | * | 1/1996 | Joseph et al. ............... 395/500 |
| 5,500,941 A | | 3/1996 | Gil .......................... 395/183.14 |
| 5,513,122 A | | 4/1996 | Cheng et al. ............... 364/489 |
| 5,623,499 A | * | 4/1997 | Ko et al. .................... 371/22.1 |
| 5,740,353 A | * | 4/1998 | Kreulen et al. ........ 395/183.18 |
| 5,918,037 A | * | 6/1999 | Tremblay et al. ...... 395/500.03 |
| 6,044,211 A | * | 3/2000 | Jain ....................... 395/500.19 |
| 6,059,837 A | * | 5/2000 | Kukula et al. ................ 703/27 |
| 6,289,252 B1 | * | 9/2001 | Wilson et al. .................. 700/7 |
| 6,681,331 B1 | * | 1/2004 | Munson et al. ............. 731/201 |
| 6,694,290 B1 | * | 2/2004 | Apfelbaum et al. .......... 703/22 |

OTHER PUBLICATIONS

Frankl, P.G. et al., "Provable Improvements on Branch Testing", IEEE Transactions on Software Engineering, US, IEEE Inc. New York, vol. 19, No. 10, 1993, pp. 962–975.

Hammer Technologies CallMaster Datasheet, A Teradyne Company Brochure. (4 pages).

TestMaster, Automating Software Quality, Teradyne Software and Systems Test's TestMaster Software Automates (5 pages). Test Generation for a Wide Range of Software Based Systems, Teradyne Software & Systems Tests 1994.

Teradyne Testmater Automating Software Quality Add More Resources. Limit New Functionality. Make it Fit the Schedule Brochure.

Teradyne TestMaster, Shorten the Time–to–Quality for your Telecom Systems Brochure 4 pages.

Apfelbaum, Automating the Test Generation Process, presented at the Software Testing Analysis & Review Conference in May 1995, pp 1–12.

Apfelbaum, The Practical Engineer, Spec–based Tests Make Sure Telecom Software Works, IEEE Spectrum 34:78–83, 1997.

Apfelbaum, Automated Functional Test Generation, presented at the Autotestcom Conference Aug. 1995. (7 pages).

Clarke, Automated Test Generation from a Behavioral Model, presented at the Software Quality Week Conference, May 1998. (7 pages).

(List continued on next page.)

*Primary Examiner*—Thai Phan
(74) *Attorney, Agent, or Firm*—David W. Rouille, Esq.; Chapin & Huang, L.L.C.

(57) ABSTRACT

A method of using a computer to analyze an extended finite state machine model of a system includes providing a graphical user interface that presents a table of rows, receiving data in at least one table row, and determining at least one path through the states and transitions of the extended finite state machine model using at least one of the rows in the table.

19 Claims, 13 Drawing Sheets

OTHER PUBLICATIONS

Esmelioglu et al., Automated Test Generation, Execution, and Reporting, presented at the Pacific Northwest Software Quality Conference, Oct. 1997, pp. 1–16.

Hutchins et al., Experiments on the Effectiveness of Dataflow–and Controlflow–Based Test Adequacy Criteria Research Paper, May 1994, pp. 191–200.

Meyer, AT&T Network & Computing Services, Applying Use–Case Methodology to SRE and System Testing, presented at the STAR West Conference, Oct. 1998, pp. 1–16.

Savage et al., Automated Test Methodology for Operational Flight Programs, present at the IEEE Aerospace Conference, Feb. 1997, (9 pages).

Sowers, Positive Results at Cadence Design Systems Using Model Reference Testing Approach. (2 pages).

Stephenson et al., Using Advanced Tools to Automate the Design, Generation and Execution of Formal Qualitification Testing, presented at the Autotestcom Conference, Sep. 1996. (6 pages).

* cited by examiner

| REQ. # | VERSION | DESCRIPTION | FEATURES | REFERENCED OBJECTS | SOURCE | COMMENTS |
|---|---|---|---|---|---|---|
| 1.01 | 1 | NO W/DRAWAL W/O VALID PIN | ACCESS | !(WITHDRAWAL && (!OKPIN)) | | |

| TOTAL TEST PER REQ. | 2 | 3 | 2 | 3 | 3 | 0 | 1 | |
|---|---|---|---|---|---|---|---|---|
| TEST NUMBER | 1.0 | 1.0.1 | 1.0.2 | 1.1 | 1.1.1 | 1.2 | 1.2.1 | TOTAL REQ PER TEST |
| 1 | | X | | | X | | X | 3 |
| 2 | X | | | | | | | 1 |
| 3 | | X | | X | | | | 2 |
| 4 | | | | X | | | | 1 |
| 5 | | | | | | | | 0 |
| 6 | X | | | X | | | | 2 |
| 7 | | X | X | | X | | | 3 |
| 8 | | | | | | | | 0 |
| 9 | | | | | X | | | 1 |
| 10 | | | X | | | | | 1 |

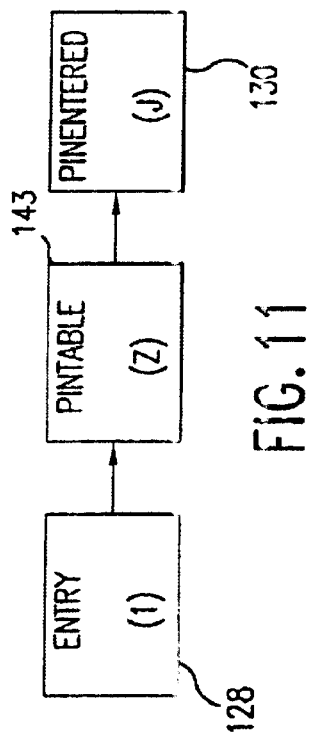

268
NUMBER PIN, STRING. OTHERINFORMATION ⎯⎯ 266
270 { 001, "FIRST PIN"
      002, "SECOND PIN"

FIG. 15

ANALYZING AN EXTENDED FINITE STATE MACHINE SYSTEM MODEL

BACKGROUND OF THE INVENTION

System testing contributes significantly to system development and maintenance costs. TestMaster® software sold by Teradyne® Software and System Test, Inc. of Nashua, N.H. can reduce testing costs while increasing testing quality.

Referring to FIG. 1, TestMaster® software 100 enables a designer to create 102 an extended finite state machine model of a system. An extended finite state machine is represented by a directed graph that includes states interconnected by transitions. The software 100 provides a graphical user interface that enables the designer to "draw" the model by defining the states and connecting them together with directional lines that represent transitions. The model is independent of the system being modeled and can be created before or after the system is developed.

After the designer creates 102 the model, the software 100 detects 104 paths through the model states and transitions and generates 106 testing programs corresponding to each of the detected paths. Execution of the generated testing programs can identify system design flaws and highlight differences between the model created and the actual behavior of the underlying system.

Referring to FIG. 2, an extended finite state machine model 108 of a system includes states 110–116 interconnected by transitions 118–124. For example, as shown, a model 108 includes states 110–116 and transitions 118–124 representing a bank machine system that dispenses cash to customers entering an authorized PIN (Personal Identification Number).

The TestMaster® system automatically detects different paths through the model 108. For example, as shown in FIG. 3, a path through the model can include model elements A-$T_{AB}$-B-$T_{BC}$-C-$T_{CD}$-D. This path corresponds to a customer correctly entering an authorized PIN and successfully withdrawing cash. As shown in FIG. 4, a different path through the model can include model elements A-$T_{AB}$-B-$T_{BD}$-D. This model path corresponds to a customer who fails to correctly enter an authorized PIN.

TestMaster® offers many different procedures for detecting paths through a model. For example, a user can select from comprehensive, transition-based, N-switch, and quick-cover path detection. Comprehensive path detection outputs a test for every possible path through the model. Transition based path detection outputs tests such that each transition is included in at least one test. N-switch path detection outputs tests such that each unique sequence of N+1 transitions are included in at least one test. Comprehensive, transition, and N-switch path detection are currently implemented using a depth-first search. In contrast, quick-cover uses a "top-down" search and can output tests such that no transition is used more than a specified number of times. U.S. Pat. No. 08/658,344 entitled "Method and Apparatus for Adaptive Coverage in Test Generation" describes implementations of programs for detecting extended finite state machine paths.

Referring again to FIG. 2, in addition to transitions and states, a model can incorporate variables and expressions that further define the model's behavior. TestMaster® can evaluate the expressions to assign variable values (e.g., y=mx+b) or to determine whether an expression is TRUE or FALSE (e.g., A AND (B OR C)). The expressions can include operators, variables, and other elements such as the names of states, transitions, and/or sub-models. When a named state, transition, or sub-model is in included in an expression, the model element evaluates to TRUE when included in the path currently being detected. For example, in FIG. 2, an expression of "(A && B)" would evaluate to TRUE for path portion "A-$T_B$-B". As shown, expressions can use a PFL (Path Flow Language) syntax that resembles the C programming language. PFL and functions that can be called from PFL are described in The TestMaster® Reference Guide published by Teradyne®.

A model designer can associate the expressions with model elements to further define model behavior. For example, a designer can associate predicates and/or constraints with different states, transitions, and/or submodels. Both predicates and constraints are evaluated during path detection and determine which transitions can be included in a path.

When path detection instructions encounter a model element having an associated predicate, the predicate expression is evaluated. If the predicate evaluates to TRUE, the model element associated with the predicate can be used in the path. For example, as shown in FIG. 2, transition $T_{BD}$ 124 has an associated predicate 126 ("!OKPin") that determines when a path can include the transition. As shown, the predicate 126 is a boolean expression that permits inclusion of the transition 124 in a path being detected when the boolean variable OKPin is FALSE and the path being detected has reached state B.

Similarly, when path detection instructions encounter a model element having an associated constraint, the constraint expression is evaluated. If the constraint evaluates to FALSE, the model element associated with the constraint cannot be used in the path being detected. For example, as shown in FIG. 2, a transition 123 can connect a state 114 to itself. To prevent a path from including a large or possibly infinite number of the same transition in a single path, a designer can specify a constraint expression 125 that limits use of a transition in a path. The "Iterate(3)" expression associated with the transition 123 limits a path through the model to including transition 123 three times. Thus, if evaluated at state C after looping around transition $T_{CC}$ three times, the constraint would evaluate to FALSE and prevent further use of the transition in the current path. The constraint acts as a filter, eliminating generation of unwanted testing programs.

Referring to FIG. 5, a model can also include one or more sub-models. For example, the box labeled "EnterPIN" in FIG. 2 may be a sub-model 112 that includes additional states 128–136, transitions 138–150, and expressions. As shown, the sub-model 112 sets 150 the model variable OKPin to TRUE when the customer PIN equals 1 148; otherwise, the sub-model sets the model variable OKPin to FALSE 146.

Sub-models encourage modular system design and increase comprehension of a model's design. Referring to FIG. 6, when the software 100 detects different paths through the system, the sub-model is essentially replaced with the states and transitions included in the sub-model.

Referring again to FIG. 5, a designer can define more than one transition 138–142 between states 128, 130. The designer can also associate expressions (e.g., PIN=1) with each transition 138–142, for example, to set model variables to different values. For example, as shown, a designer has defined three transitions between the "Entry" 128 and "PINEntry" 130 states that each set a PIN variable to different value. Defining multiple transitions between states increases the number of paths through a model. For example, paths through the sub-model 112 can include I-$T_{IJ(1)}$-J-$T_{JK}$-K-$T_{KM}$-M, I-$T_{IJ(2)}$-J-$T_{JL}$-L-$T_{LM}$-M, and I-$T_{IJ(3)}$-J-$T_{JL}$-L-$T_{LM}$-M. The use of multiple transitions enables testing of different conditions within the same model.

SUMMARY OF THE INVENTION

In general, in one aspect, a method of using a computer to analyze an extended finite state machine model of a system includes providing a graphical user interface that presents a table of rows, receiving data in at least one table row, and determining at least one path through the extended finite state machine model using at least one of the rows in the table.

EFSMAs are known to those of ordinary skill in the art. EFSMAs are described in detail in U.S. Pat. No. 5,918,037 (the '037 patent). As described in the '037 patent the EFSMA can be drawn out in a tree diagram. States (e.g. S1, S2, and S3) of a call to the model are represented as nodes of the tree (e.g. A1, A2, A3). The transitions (e.g. T1, T2, T3, T4 and T5) are represented as branches interconnecting the nodes. Paths through the EFSMA are generated by doing a depth first search through the tree structure. The search is kept track of by use of a model stack and a path stack. As each transition is traced out, an indication of that node and transition is pushed onto the path stack. As the path crosses from one model into the next, a new frame is pushed onto the model stack.

Each entry on the path stack is a pair of values, representing a state and transition from that state. For example, the entries in the path stack may indicate that the path was traced in the following order: (A1, T1), (A2, T3), (A3, T5), (B1, X). The model stack may show that the Path 1 goes through Models A and B.

Once a complete path has been generated through the EFSMA, the next path is generated by popping a frame from the path stack and, if the transition popped from the path stack was to the entry state of a model, a frame is popped from the model stack as well. Once a frame is popped from the top of the path stack, the new frame at the top of the stack includes values representing a transition into one of the states in the EFSMA. It there is an "acceptable" transition out of that state, another frame is pushed on the path stack indicating that transition. Items are again pushed on the stack until a complete path has been generated.

Where there is no acceptable transition, another frame is popped from the path stack, leaving a transition to a different state at the top of the path stack. Once again, a check is made of whether there is an acceptable transition out of this state. Frames are popped from the stack until there is a transition is at the top of the stack that leads to a state from which there is another "acceptable" transition.

Once an "acceptable" transition is reached, items are then pushed onto the stack until a terminal state of the EFSMA is reached. At this point, the path stack contains a new path. The process continues in this fashion, pushing and popping items onto the path stack until, at some point, all the transitions are popped from the path stack without reaching a state that has an "acceptable" transition.

An "acceptable" transition is identified by selecting a transition from that state that has not been used at that point in a path. For example, when state A2 is placed on the stack at a particular point P, there must be some way to keep track of the two transitions, T3 and T2 from that state. Transition T3 is included in Path 1. When the stack frame represented by that point P is pushed on the stack, a data structure could be set-lip to show that there are transitions T2 and T3 from that state. When Path 1 is traced out, the data structure would be update to show that transition T3 had been taken from that point P. Thus, When the path stack is popped again to point P, the data structure shows that transition T2 has not been taken from that point.

In this way, all paths are traced out without duplication. Of course, if a particular transition violates a user specified constraint, it is not considered "acceptable." Likewise, when the model specifies that only certain transitions are allowed in certain circumstances, a check must be made whether those circumstances exist before a transition is considered acceptable.

Embodiments can include one or more of the following features. At least one table row can be a transition between model states. The rows can store assignments, predicates, constraints, likelihood, and/or probability values. Data may be received from a user or imported from a data source.

In general, in another aspect, a method of using a computer to analyze an extended finite state machine model of a system includes receiving an identification of a data source, importing data from the data source, and determining at least one path of states and transitions through the model using the imported data.

Embodiment may include one or more of the following. The data source may be a file, a database, and/or a spreadsheet. The data can include an assignment, a predicate, a constraint, a likelihood value, and/or a probability. The data can be used to define at least one transition between two states.

In general, in another aspect, a method of using a computer to analyze an extended finite state machine model of a system includes receiving likelihood or probability values for a plurality of transitions between two states, and determining at least one path through the model states and transitions by selecting one of the transitions for inclusion in the path based on the likelihood or probability values.

Embodiments may include one or more of the following. The method may include determining eligible transitions during the determining of at least one path and selecting one of the transitions based on the likelihood or probability values of the eligible transitions. The method may include normalizing the likelihood values to produce a probability values.

In general, in another aspect, a computer program product, disposed on a computer readable medium, for analyzing an extended finite state machine model of a system includes instructions for causing a processor to provide a graphical user interface that presents a table of rows, receive data in at least one table row, and determine at least one path through the extended finite state machine model using at least one of the rows in the table.

In general, in another aspect, a computer program product, disposed on a computer readable medium, for analyzing an extended finite state machine model of a system includes instructions for causing a processor to receive an identification of a data source, import data from the data source, and determine at least one path of states and transitions through the model using the imported data.

In general, in another aspect, a computer program product for analyzing an extended finite state machine model of a system includes instructions for causing a processor to receive likelihood or probability values for a plurality of transitions between two states, and determine at least one path through the model states and transitions by selecting one of the transitions for inclusion in the path based on the likelihood or probability values.

BRIEF DESCRIPTION OF THE DRAWINGS

These and other features of the invention will become more readily apparent from the following detailed description when read together with the accompanying drawings, in which:

FIG. 8 is a screenshot of a table of system requirements used by the process of FIG. 7;

FIG. 9 is a screenshot of a requirements report produced by the process of FIG. 7;

FIG. 11 is a diagram of an extended finite state machine model that includes a table model element;

FIG. 12 is a diagram of a table having rows incorporated into the model;

FIG. 15 is a listing of a comma separated value file having values that can be imported into an extended finite state machine table model element;

DESCRIPTION OF THE PREFERRED EMBODIMENTS

Introduction

The inventors have invented different mechanisms that enable testers, developers, and others to detect design and implementation flaws in a system. These mechanisms can be included in TestMaster® or other software or hardware systems.

Requirements and Assertions

Figure 7:
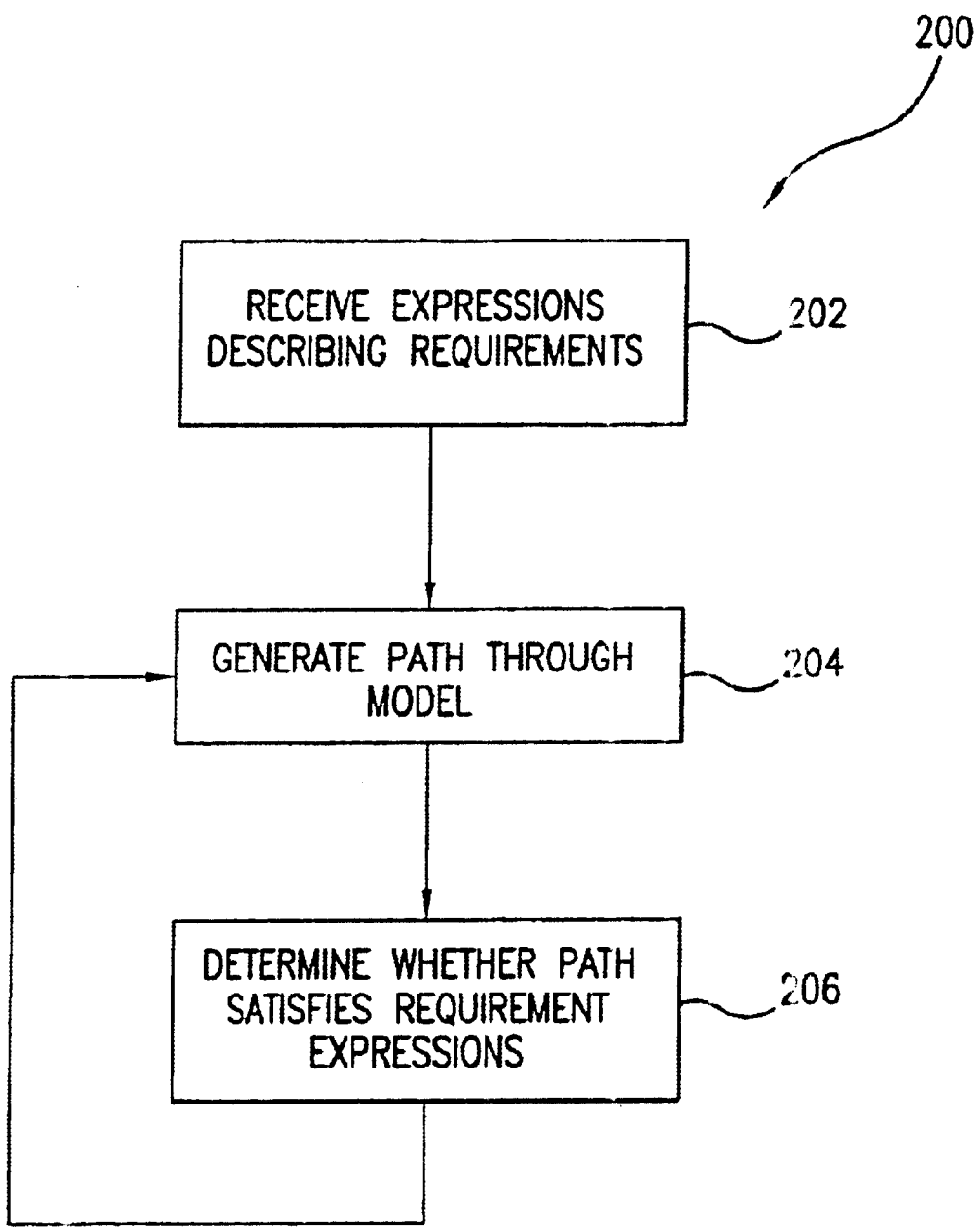
FIG. 7 is a flowchart of a process for determining whether a system model satisfies system requirements.

Referring to FIG. 7, prose descriptions of system requirements often appear in functional and design specifications or are included in requirement documents produced by a customer. Requirements can also be gleaned from customers, bug-lists, etc. As shown in FIG. 7, a process 200 enables users to specify 202 requirements as an expression of elements (e.g., variables, sub-models, states, and transitions). For each path 204 through a model, the process 200 evaluates 206 all requirement expressions to determine which requirements are satisfied.

Figure 1:
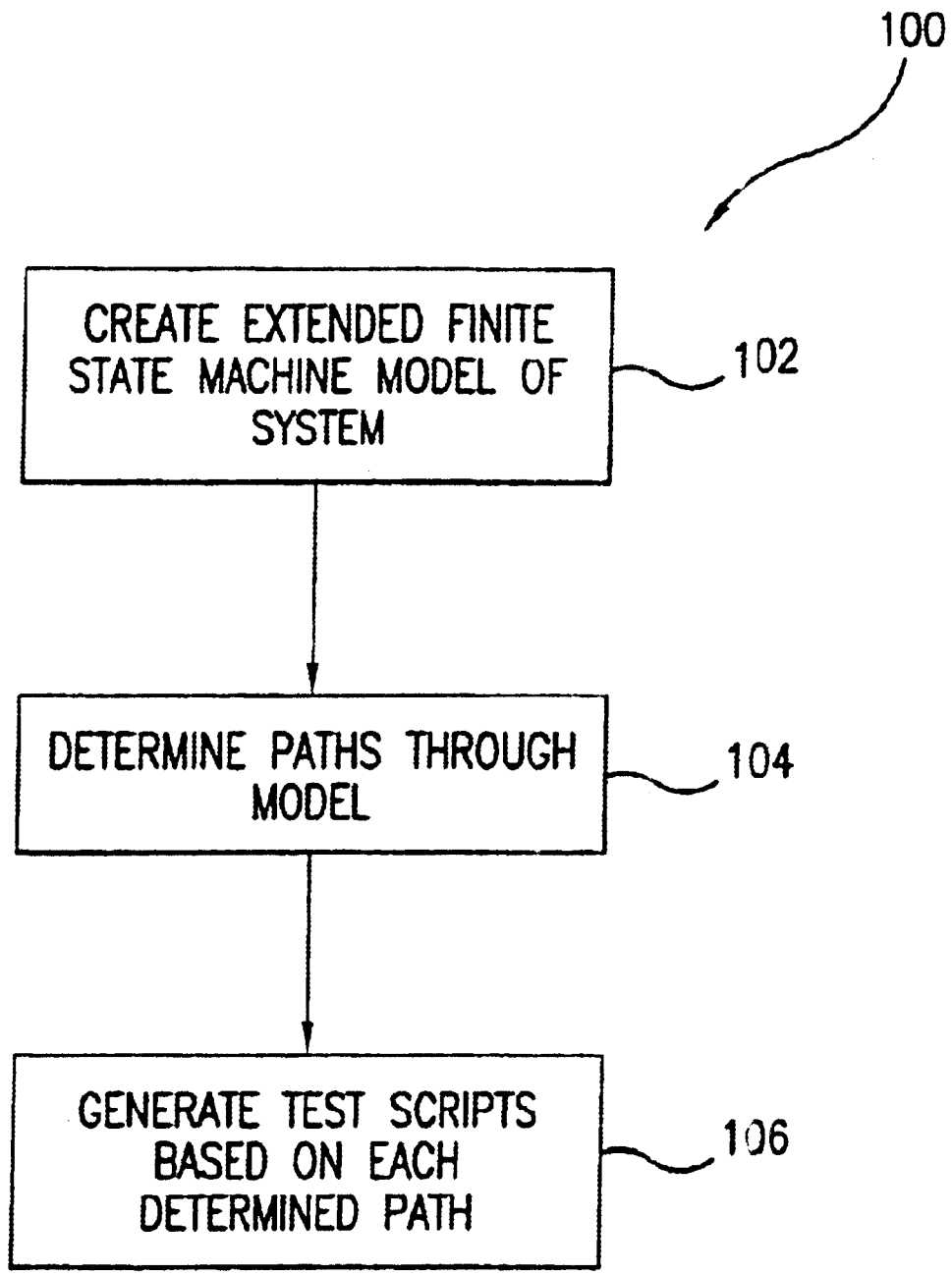
FIG. 1 is a flowchart of a process for using an extended finite state machine model to generate tests for a system according to the PRIOR ART.
Figure 2:
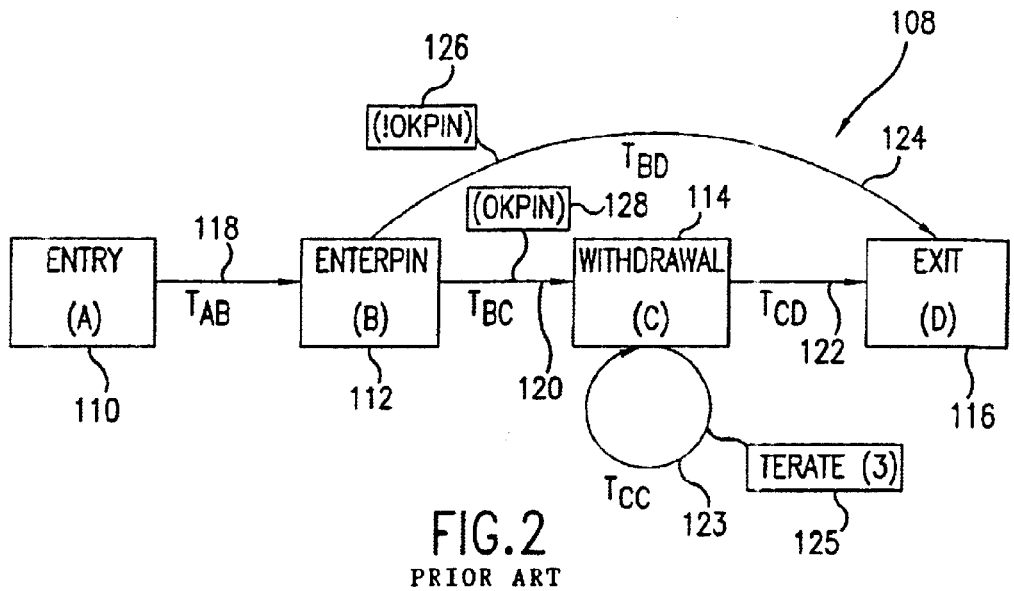
FIG. 2 is a diagram of an extended finite state machine model according to the PRIOR ART.
Figure 3:
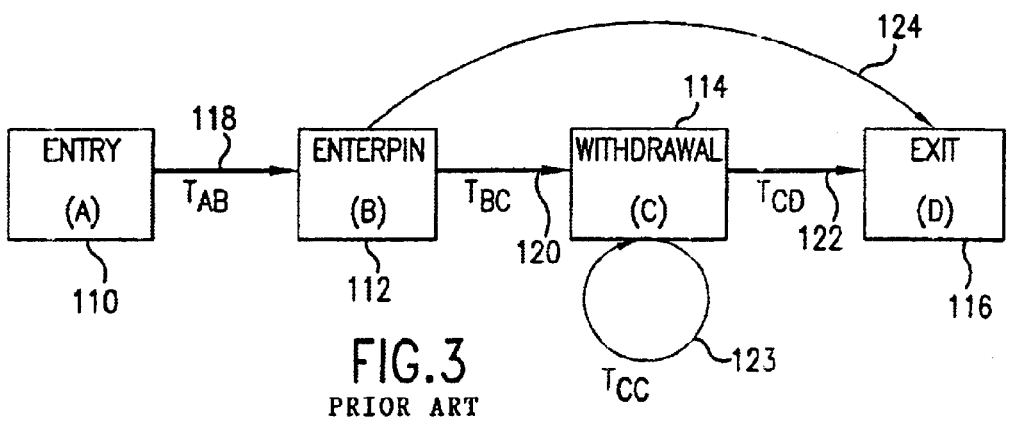
FIGS. 3 and 4 are diagrams of paths through the extended finite state machine model of FIG. 2 according to the PRIOR ART.
Figure 4:
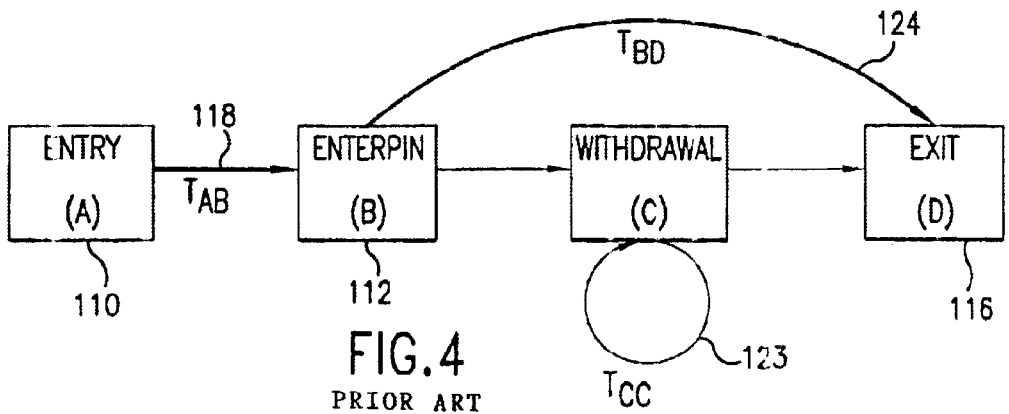
Figure 5:
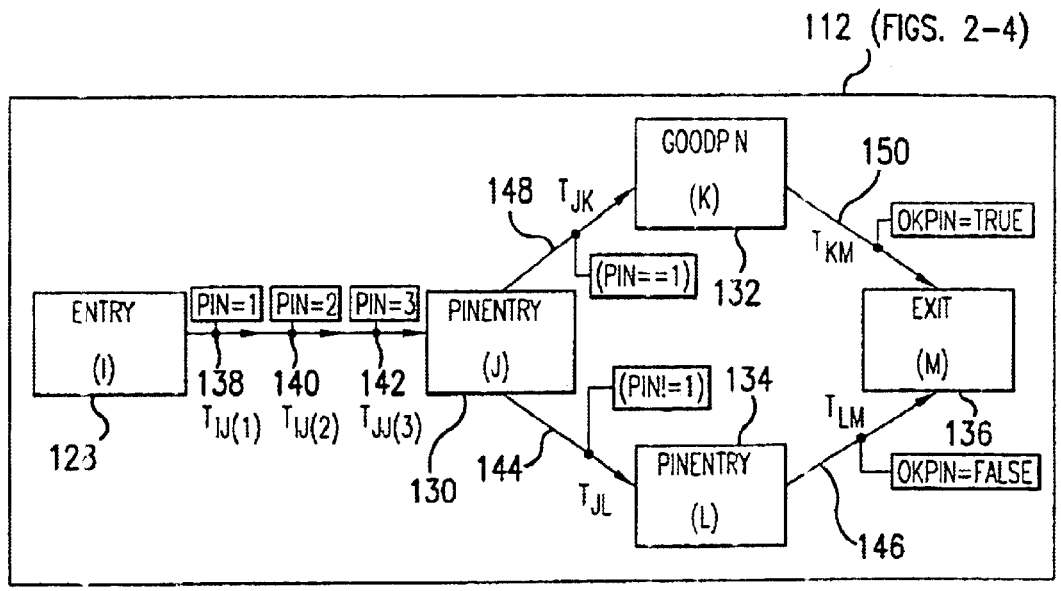
FIG. 5 is a diagram of a sub-model according to the PRIOR ART.
Figure 6:
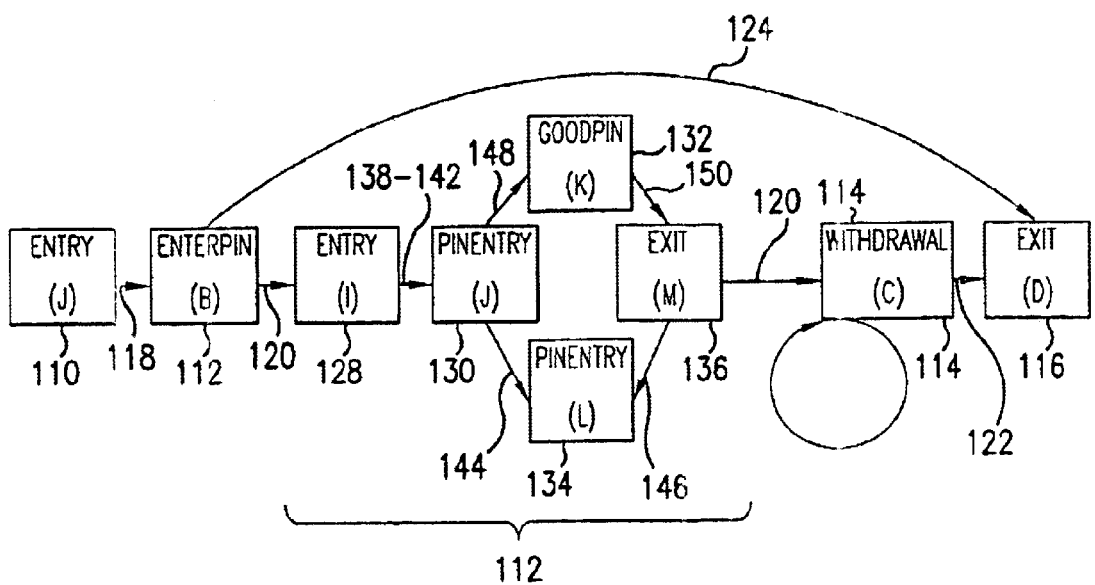
FIG. 6 is a diagram of the extended finite state machine model that includes the states and transitions of the sub-model of FIG. 5 according to the PRIOR ART.

For example, referring again to FIG. 2, the bank machine system functional specification may describe a requirement that no withdrawals should occur if a customer's PIN is not authorized. A user can ensure compliance with this requirement by defining a boolean expression of "NOT (withdrawal AND (NOT OKPin))". After each path is detected through the model, the requirement expressions defined for the model are evaluated. The path satisfies any requirement expression that evaluates to TRUE.

Referring to FIG. 8, a user can specify and view requirement expressions via a graphical user interface. The interface shown enables a user to specify each system requirement as a row in a table 222. The table 222 includes columns for a requirement ID 208 and version number 210 for each requirement. This enables a user to quickly correlate requirements with their descriptions in written documents and specify which collections of requirements should be used during path detection (e.g., only version 2 requirements need be satisfied). The requirement ID 208 can also be used as elements in other requirement expressions.

The table also includes columns for a prose description 212 of each requirement and the boolean requirement expression 216. The table can also include a column 214 for specifying a system feature involved in the requirement. A feature may have more than one associated requirement. Additionally, a table column may permit a user to name the row for inclusion in other expressions. Further, a table can include a "source" column 218 for Hyperlinks (e.g., Universal Resource Locators) which link to external documents describing a requirement.

The information included in the table 222 may be entered manually or imported, for example, from a database, spreadsheet, or a CSV (comma separated value) file. Similarly, the table 222 information may also be exported. Additionally, different requirements may be enabled or disabled by a user.

Referring to FIG. 9, the process can generate a report 224 that describes tests that can be run to test the specified requirements. As shown, the report 224 may be a table that includes a row for each test generated and an indication of the different requirements satisfied by the test. For example, row 231 for test path 3 satisfies requirements 1.0.1 and 1.1.

The report 224 can also summarize test results, for example, by displaying the number of tests satisfying each requirement 226 or displaying the number of requirements a particular path satisfied 232. The report enables a user to understand the completeness of a set of tests, to understand how many of the requirements have been included in the model, to perform optimization, and to detect tests that do not satisfy defined requirements. Based on the report the user can see which paths satisfied the requirement and use the testing programs generated for these paths to test the system being modeled.

The requirements feature described above can also limit (i.e., "filter") the test scripts generated. For example, a user can specify that test scripts should only be generated for paths satisfying a particular requirement. Thus, only testing programs directed to testing particular features are generated.

Figure 10:
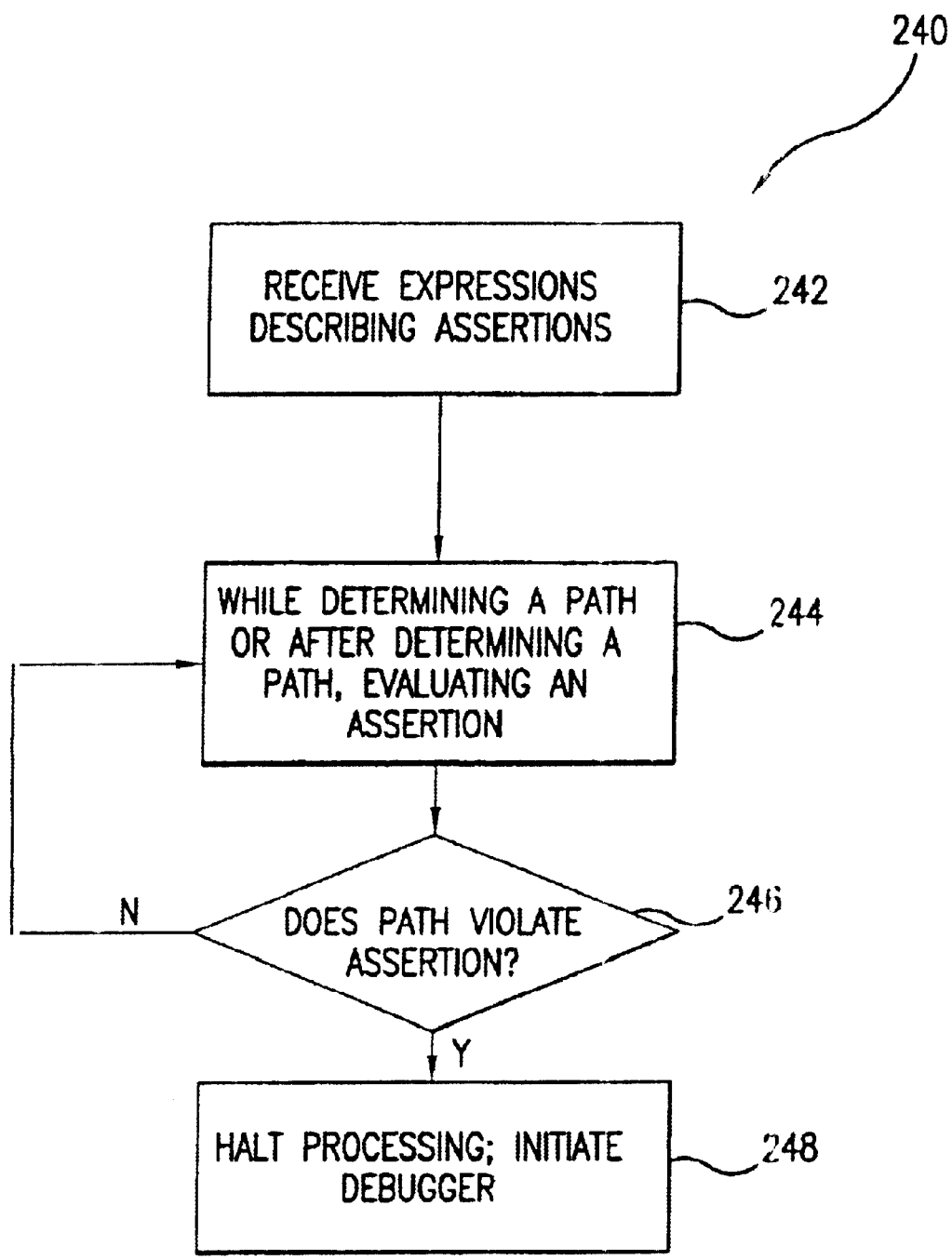
FIG. 10 is a flowchart of a process for determining whether a system model satisfies specified assertions.

Referring to FIG. 10, similar to requirements, assertions enable a user to specify an expression for evaluation. However, while a path through a perfectly designed model may not satisfy any requirement expressions, assertions represent expressions that should always be satisfied (e.g., TRUE) when evaluated. Failure to satisfy an assertion can represent significant model flaws needing immediate attention (e.g., when an abnormal or unexpected condition occurs).

A process 240 for determining whether a model complies with a set of assertions includes receiving 242 assertion expressions. A user can specify that an assertion expression be evaluated at different points in the model, for example, before or after entering a particular state, transition, or sub-model. In another embodiment, a designer can specify that an assertion expression should be automatically evaluated before and/or after entering every sub-model element. Additionally, a designer can specify that an assertion expression should be automatically evaluated after each path through the model is detected.

When the process 240 determines 246 a path violates an assertion (i.e., the boolean assertion expression evaluates to FALSE), the process 240 can immediately alert 248 the user of the particular path and other model information that caused the assertion violation. For example, the process 240 can call a model debugger that enables a user to view model information such as the value of different variables, the assertion violated, and model elements in the path that violated an assertion. This enables a user to examine the model context that caused the assertion to fail. The process 240 can further provide an error message and/or provide a display that highlights the path the caused the violation.

Transition Tables

Referring to FIG. 11, a graphical user interface provides a table 143 model element the user can include in a model. The table 143 can specify multiple sets of data to be included in the generated test.

Referring to FIG. 12, each row can include one or more variable value assignments, for example, each row can include a different value for the PIN model variable 250 and a name of the customer assigned that PIN (not shown). Each row can further include predicate 254 and/or constraint expressions 256. The path detection instructions can select one or more of the rows for each path. Thus, the table 143 aprovides a convenient mechanism for viewing and defining large sets of data.

In another embodiment, the table also includes columns for specifying a source state and a destination state for each transition row (not shown). This enables an entire model to be displayed as one or more tables of rows. The tables can be used to automatically generate a graphical display of a model. Similarly, a graphical model could be used to generate corresponding tables. The equivalence of the model and the table enable a user to easily "flip" between the different model representations.

Additionally, the table may offer a column for a name of the row (not shown). The named model element can then be included in other expressions.

Figure 13:
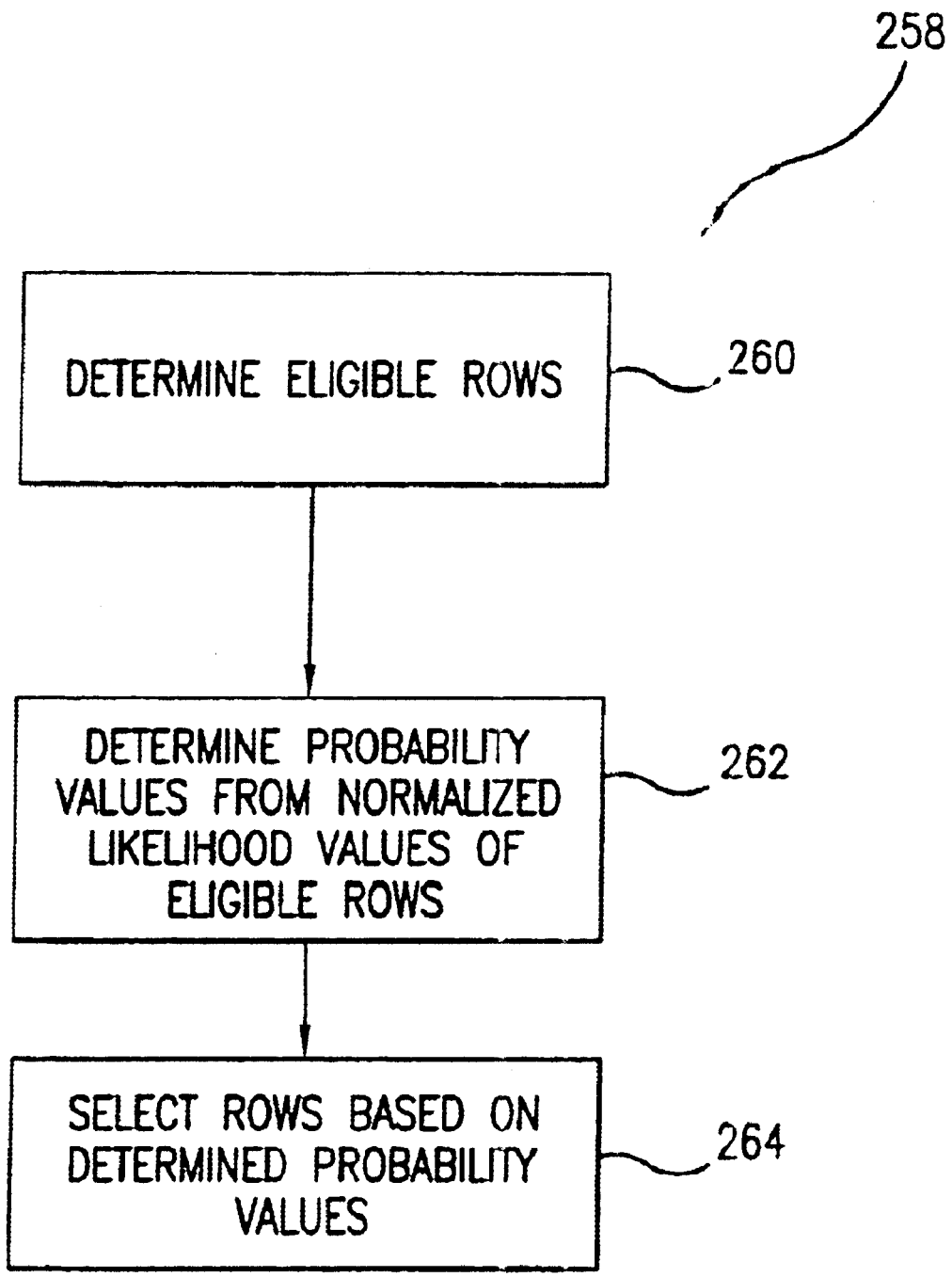
FIG. 13 is a flowchart of a process for selecting a transition based on likelihood values associated with the transitions.

Each row of the table 143 can also include a likelihood value 252. The likelihood values can be used to select a row from the table during path detection. Referring also to FIG. 13, a process 258 for selecting a row based on likelihood values includes determining currently eligible rows 260, normalizing the likelihood values of the eligible transitions 262 to produce a probability for each eligible transition, and selecting a transition based on the produced probabilities.

For example, assume the TEST model variable is set to "1" in FIG. 12. Under this assumption, PINs 001, 002, 003, and 004 represent eligible transitions because these transitions satisfy their associated predicate and/or constraint expression(s). As shown, the likelihood values in a table need not add to 1 or 100. For example, adding the likelihood values of the eligible rows (PINs 001, 002, 003, and 004) yields a total of 160. A row (e.g, representing a transition) can be selected by using the total likelihood value and the individual likelihood values of the eligible rows to dynamically create selection ranges for each row. For example, a sample set of ranges may be:

PIN=001 0.000–0.062 (e.g., 10/160)

PIN=002 0.063–0.188 (e.g., 0.062+20/160)

PIN=003 0.189–0.750 (e.g., 0.188+90/160)

PIN=004 0.751–0.999 (e.g., 0.750+40/160).

Thereafter, a row can be selected by generating a random number between 0 and 1 and selecting the transition having a range covering the generated number. For example, a random number of 0.232 would result in the selection of the transition setting the PIN variable to "003". Use of probabilities enables a model to be tested using data that reflects actual usage. Additionally, the use of probabilities enables a small set of rows to represent a large set of data. Further, normalizing likelihood values to produce probabilities enables the path detection instructions to process probabilities with different combinations of eligible rows.

Other embodiments can include variations of the features describe above. For example, probabilities and/or likelihood values can be assigned to transitions with or without the use of table model elements. Additionally, though the determination of eligible transitions and normalizing their respective likelihood values provides a designer with flexibility, these actions are not required to take advantage of the benefits of including probabilities in the model.

Importing Data Into the Model

Figure 14:
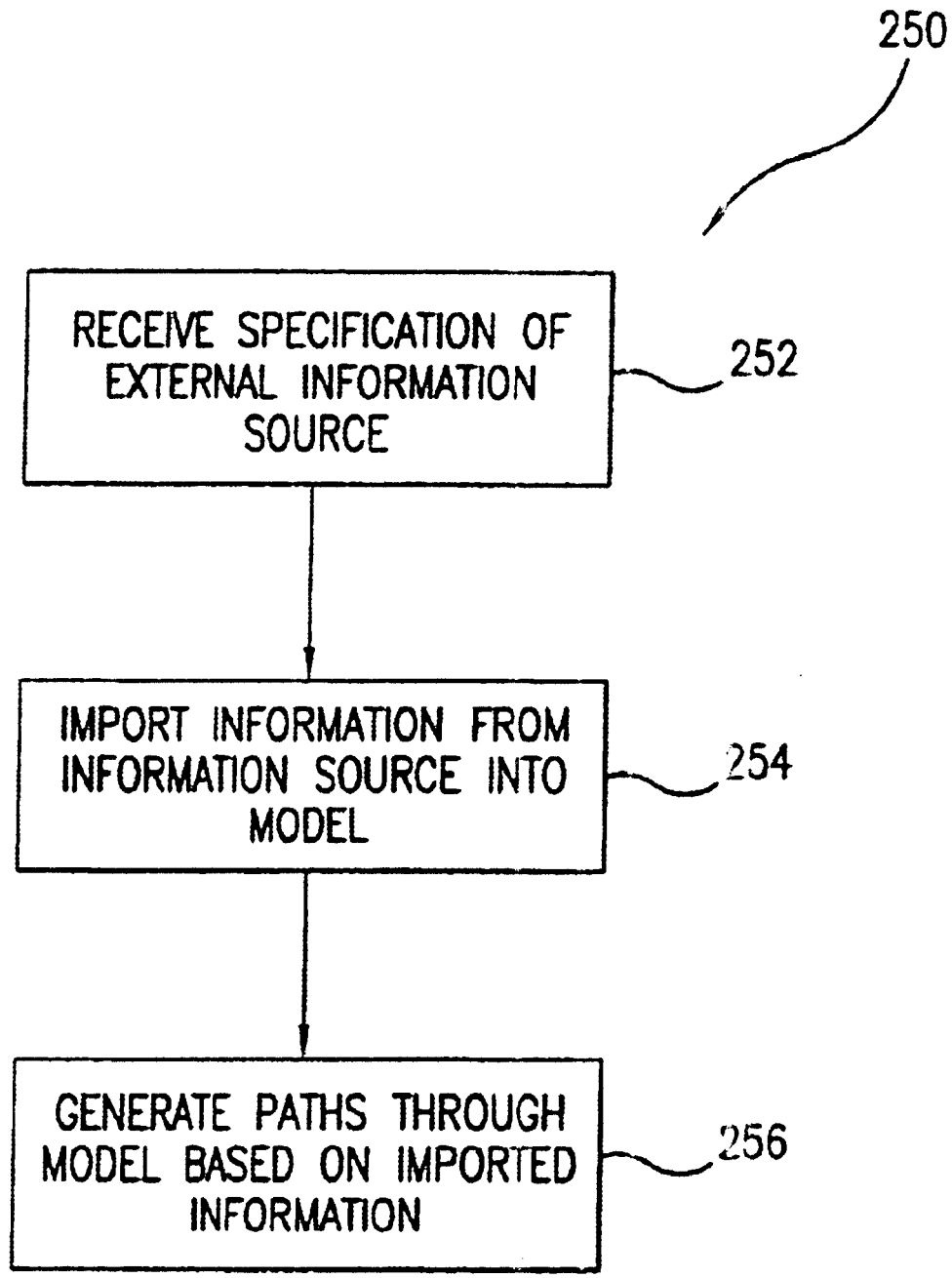
FIG. 14 is a flowchart of a process for importing data and other information into an extended finite state machine model.

The rows in the table and other model information can be hand entered by a user. Alternatively, a user can import the data from an external source. Referring to FIG. 14, a process 250 enables users to import data into a model by specifying 252 an external information source for importing 254 into the model. For example, referring to FIG. 15, for, a user can specify a file name of a CSV (Comma Separated Value) file. The first line 266 of the CSV file defines table schema information such as the table variables and their corresponding data types. For example, as shown the variable named PIN has been type-cast as a number 268. Subsequent information in the CSV is paired with the variables defined in the first line 266. For example, the number 001 is paired with the variable PIN while the string "FirstPIN" is paired with the string variable named OtherInformation.

A database or spreadsheet could also be used as a source of external data. For example, a user could specify a relational database view or table. In response, instructions can automatically access the database to obtain schema information for the table. For example, an SQL (Structured Query Language) select command can be used to determine the variables and data included in a particular table or view and output this information to a CSV file. For interfacing with different types of data sources, the instructions may support ODBC (Open Database Connectivity) drivers.

Importing data from an external source can relieve a user from having to define a large number of transitions between states by hand. However, the importing capability is not limited to transitions. Additionally, the imported data can reflect actual testing conditions. For example, a log file produced by a system in actual use can provide a valuable source of data for the model.

Specifying a Mix of Paths

Figure 16:
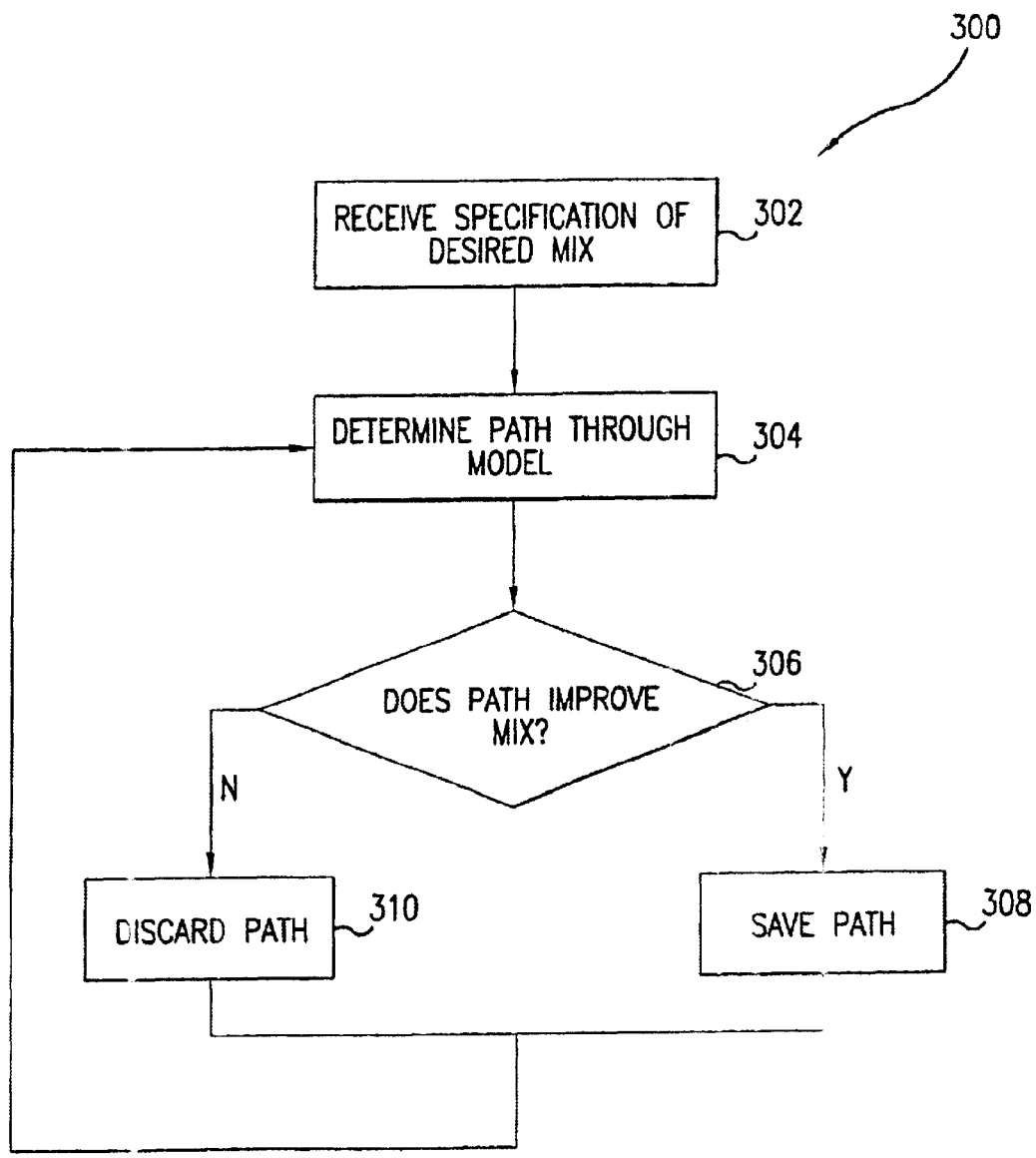
FIG. 16 is a flowchart of a process for detecting paths through a model that conform to a user specified mix of paths.

Referring to FIG. 16, a process 300 enables a user to control the mix of paths outputted during path detection. The process 300 enables a user to specify 302 a desired mix of generated tests. For example, a user can specify a percentage (or ratio) of paths that include a particular model element or that satisfy a particular expression. During path detection, instructions track the current mix of paths (e.g., how many paths are in the mix and how many paths include the model element) and determine 306 whether a newly detected path brings the mix closer to the user specified percentage(s). If so, the newly detected path is saved in the mix. Otherwise, the path is discarded.

Many different procedures for determining whether a detected path brings the mix close to the user specified percentages could be used. For example, one procedure saves a detected path if the path satisfies any specified expression that is currently under-represented in the mix generated thus far. For example, referring to FIG. 17, a bank machine model 320 includes states 322–330 that represent different bank machine transactions. As shown, a user has specified that the mix of paths generated should include 40% 332 withdrawals 322 and 35% 334 checking-to-savings 330 transfers. Assume that after nine paths, two paths have included withdrawals 332 (i.e., 22%) and three have included checking-to-savings 330 (i.e., 33%) transactions. Further assume a newly generated path included the model elements A-$T_{AB}$-B-$T_{BF}$-F. This path includes a withdrawal 332, but no checking-to-savings 330 transactions. Since the running percentage of withdrawals 332 is only 22% as compared to a target of 40%, the new path will be included in the mix.

Other embodiments use different techniques for determining whether a path improves the mix of tests. For example, in the previous example, including the new path improved the percentage of withdrawals 332 from 22% to 33%, but would lower the percentage of checking-to-savings 330 transactions to 30%. Thus, saving the new path in the mix would bring the percentage of withdrawals 332 in the mix closer to the withdrawal target by 8% while bringing the percentage of checking-to-savings 330 by 3% away from its target. One embodiment totals the amount each current percentage is from its target percentage and compares this to the same total if the current path were saved in the mix. If the total would be reduced by inclusion of the path, the path is saved in the mix. Additionally, in some embodiments, a user can specify that some target percentages take priority over others.

Figure 17:
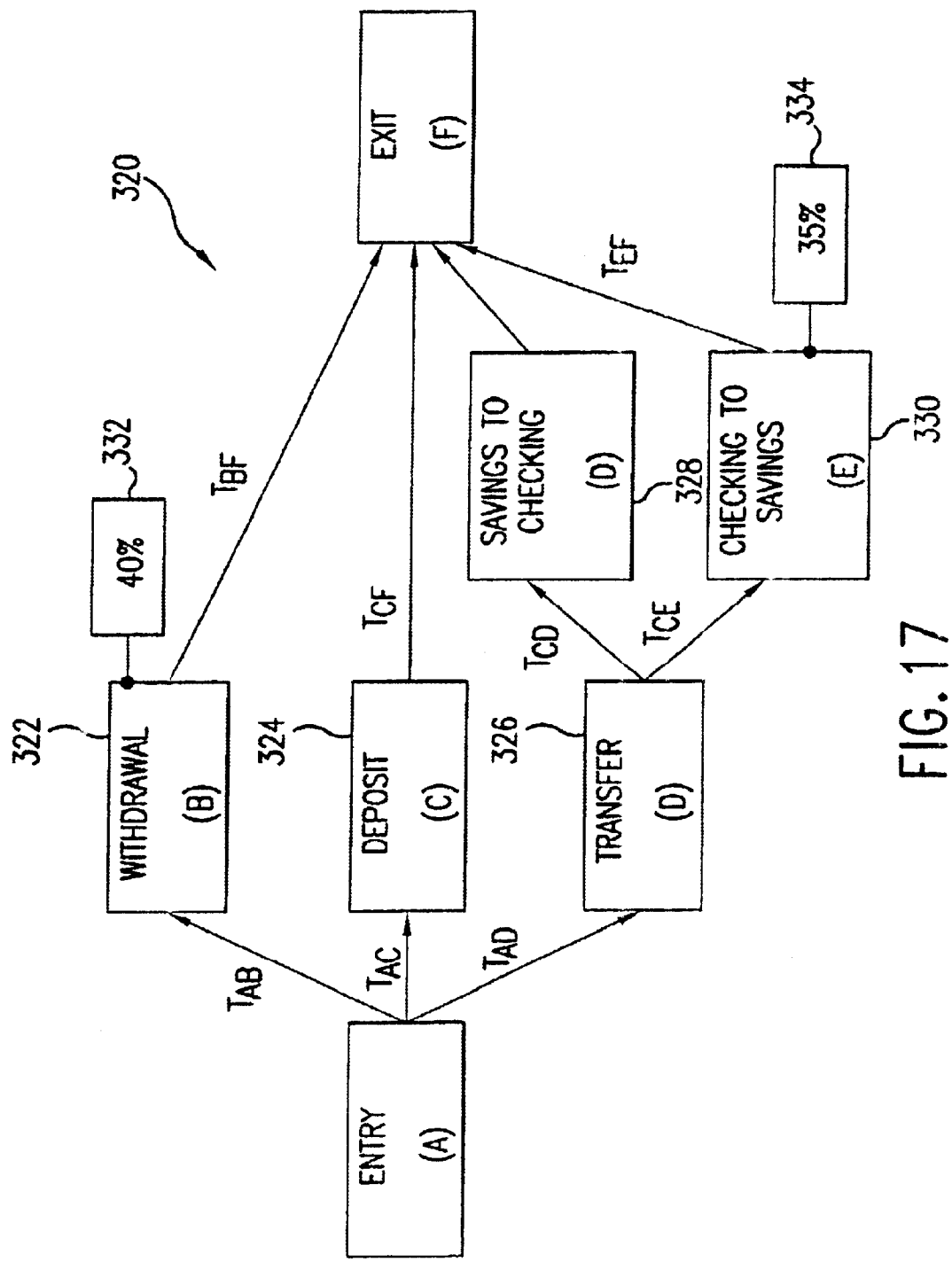
FIG. 17 is a diagram of a finite state machine model that includes model elements having target mix values.

The specified targets need not add up to 100% as each test mix expression is independent of the other expressions. For example, as shown in FIG. 17, the targets only totalled 75%. This gives a user flexibility in using the test mix feature.

By specifying a mix of paths, a user can generate tests for model features of interest without defining additional expressions to control model behavior. Additionally, the technique enables a user to produce tests relevant to areas of interest or that mimic behavior of interest.

Other Embodiments

The techniques described here are not limited to any particular hardware or software configuration; they may find applicability in any computing or processing environment.

The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system, however, the programs can be implemented in assembly or machine language, if desired. In any case, the language may be a compiled or interpreted language.

Each such computer program is preferable stored on a storage medium or device (e.g., CD-ROM, embedded ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Appendix A includes a draft of a user manual for one embodiment of the system. The user manual does not describe all features and should not be considered as limiting the scope of the following claims.

Other embodiments are within the spirit and scope of the appended claims.

What is claimed is:

1. A method of using a computer to analyze an extended finite state machine model of a system, the model having states interconnected by transitions, the method comprising:

provides a graphical user interface that presents a table of rows;

receiving data in at least one table row, said table row storing one of a likelihood value and a probability value; and determining at least one path through the extended finite state machine model using at least one of the rows in the table, the extended finite state machine model being traversed by making calls to the model and traversing transitions through the model, each call to a model making an instance of that model.

2. The method of claim 1, wherein in at least one table row comprises a transition between model states of said extended finite state machine.

3. The method of claim 1, wherein the rows store at least one of the following: an assignment, a predicate, and a constraint.

4. The method of claim 1, wherein receiving data comprises receiving data from a user.

5. The method of claim 1, wherein receiving data comprises importing data from a data source.

6. A method of using a computer to analyze an extended finite state machine model of a system, the model having states interconnected by transitions, the method comprising:

receiving an identification of a data source;

importing data from the data source, said data comprising one of a likelihood value and a probability value;

determining at least one path of states and transitions through the extended finite state machine model using the imported data, the extended finite state machine model being traversed by making calls to the model and traversing transitions through the model, each call to a model making an instance of that model.

7. The method of claim 6, where the data source comprises at least one of the following: a file, a database, and a spreadsheet.

8. The method of claim 6, wherein the data comprises at least one of the following: an assignment, a predicate, and a constraint.

9. The method of claim 6, wherein the data comprises at least one transition between two states.

10. A computer program product, disposed on a computer readable medium, for analyzing an extended finite state machine model of a system, the model having states interconnected by transitions, the computer program product including instructions for causing a processor to:

provide a graphical user interface that presents a table of rows;

receive data in at least one table row, said table row storing one of a likelihood value and a probability value; and determine at least one path through the extended finite state machine model using at least one of the rows in the table, the extended finite state machine model being traversed by making calls to the model and traversing transitions through the model, each call to a model making an instance of that model.

11. The computer program product of claim 10, wherein in at least one table row comprises a transition between model states.

12. The computer program product of claim 10, wherein the rows store at least one of the following: an assignment, a predicate, and a constraint.

13. The computer program product of claim 10, wherein the instructions for receiving data comprise instructions for receiving data from a user.

14. The computer program of claim 10, wherein the instructions for receiving data comprise instructions for importing data from a data source.

15. A computer program product, disposed on a computer readable medium, for analyzing an extended finite state machine model of a system, the model having states interconnected by transitions, the computer program product including instructions for causing a processor to:

receive an identification of a data source;

import data from the data source, wherein the data comprises at least one of a likelihood value and a probability value; and determine at least one path of states and transitions through the extended finite state machine model using the imported data, the extended finite state machine model being traversed by making calls to the model and traversing transitions through the model, each call to a model making an instance of that model.

16. The computer program product of claim 15, wherein the data source comprises at least one of the following: a file, a database, and a spreadsheet.

17. A computer program product for analyzing an extended finite state machine model of a system, the model having states interconnected by transitions, the computer program product including instructions for causing a processor to:

receive likelihood or probability values for a plurality of transitions between two states;

determine at least one path through the extended finite state machine model states and transitions by selecting one of the transitions for inclusion in the path based on the likelihood or probability values, the extended finite state machine model being traversed by making calls to the model and traversing transitions through the model, each call to a model making an instance of that model; and determine eligible transitions during the determining of at least one path, and wherein selection one of the transitions comprises selecting one of the transitions based on the likelihood or probability values of the eligible transitions.

18. The computer program product of claim 17, further comprising instructions for causing the processor to normalize the likelihood values to produce a probability values.

19. The computer program product of claim 17 wherein the data comprises one of an assignment, a predicate and a constraint.

* * * * *